(12) United States Patent
Player (10) Patent No.: US 7,039,725 B1
(45) Date of Patent: May 2, 2006

(54) BUFFER SEMAPHORE SYSTEM AND METHOD

(75) Inventor: Andrew Mark Player, Salem, NH (US)

(73) Assignee: Applied Micro Circuits Corp., San Diego, CA (US)

( * ) Notice: Subject to any disclaimer, the term of this patent is extended or adjusted under 35 U.S.C. 154(b) by 893 days.

(21) Appl. No.: 10/036,951

(22) Filed: Dec. 21, 2001

Related U.S. Application Data (60) Provisional application No. 60/257,862, filed on Dec. 22, 2000.

(51) Int. Cl.
*G06F 15/16* (2006.01)

(52) U.S. Cl. .................. 709/250; 709/213; 709/230

(58) Field of Classification Search ............. 709/217, 709/220, 250, 213, 230
See application file for complete search history.

(56) References Cited

U.S. PATENT DOCUMENTS 6,308,243 B1 * 10/2001 Kido ..................... 711/147

2003/0028804 A1 * 2/2003 Noehring et al. ........... 713/201
2003/0115307 A1 * 6/2003 Brissette ..................... 709/223

* cited by examiner

*Primary Examiner*—Zarni Maung
*Assistant Examiner*—Nghi Tran
(74) *Attorney, Agent, or Firm*—Law Office of Gerald Maliszewski; Gerald Maliszewski (57) ABSTRACT

A system and method are provided for securely buffering overhead messages in a network-connected integrated circuit. The method comprises: receiving messages including overhead bytes; collecting overhead bytes; creating a first overhead message from the collected overhead bytes; establishing a overhead message semaphore; and, saving the first overhead message until it is read, in response to the semaphore. Saving the first overhead message until it is read means not overwriting the first overhead message stored in the buffer until the buffer is read. Not overwriting the first overhead message stored in the buffer until the buffer is read includes the substeps of: setting the semaphore to the lock state; and, in response the semaphore lock state, not writing collected overhead bytes for a second overhead message to the buffer.

15 Claims, 6 Drawing Sheets

Fig. 1

FIRST PROCESSOR

Fig. 2a   OTUk ROW (SHOWN BEFORE INTERLEAVED TRANSMISSION)

Fig. 2b OTUk ROW (SHOWN AFTER INTERLEAVED TRANSMISSION)

| ROW | COLUMN 1 ... 16 17 | 3824 3825 ... 4080 |
|---|---|---|
| | OH | PAYLOAD | FEC PARITY |

Fig. 2c

| ROW | COLUMN 1 ... 14 15 16 17 | ... 3824 |
|---|---|---|
| 1 | OTUk OVERHEAD / OVERHEAD | |
| 2 | ODUk OVERHEAD / OPUk OVERHEAD | OPUk PAYLOAD (4× 3808 bytes) |
| 3 | ODUk OVERHEAD | |
| 4 | ODUk OVERHEAD | |

COLUMN #

| ROW # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FRAME ALIGNMENT BYTES | | | | | | MFAS | SM | | | GCC0 | | RES | | OVERHEAD | |
| 2 | RES | | | TCM ACT | TCM6 | | TCM5 | | TCM4 | | | RES | | FTFL | OPUk OVERHEAD | |
| 3 | TCM3 | | TCM2 | | TCM1 | | | PM | | | EXP | | | | | |
| 4 | GCC1 | GCC2 | | APS/PCC | | | | | | | RES | | | | | |

BUFFER SEMAPHORE SYSTEM AND METHOD

This application claims the benefit of Provisional Application No. 60/257,862, filed Dec. 22, 2000.

BACKGROUND OF THE INVENTION

1. Field of the Invention

This invention generally relates to digital wrapper format communications and, more particularly, to a system and method for protecting an overhead message in a buffer from being overwritten in communications with a digital wrapper data processor.

2. Description of the Related Art

As noted in U.S. Pat. No. 6,308,243 (Kido), in a variety of application apparatuses having embedded microcomputers, a real time multitask system is used for processing a number of tasks. In the case where one resource, for example a hard disk drive, is shared for a plurality of tasks, the state of the resource (the contents) can be destroyed by uncontrolled accessing. It is thus necessary for the multitask system to grant exclusive control of the resource access to one task at a time.

A conventional multitask system includes an exclusive control module termed "semaphore" for carrying out the exclusive control. The term, semaphore, is derived from a railroad signaling device with arms. A semaphore, as used in a computer system, remains held in its reset state by an operating system (OS) when the resource is accessed by none of the tasks. When one of the tasks intends to access the resource, it must receive a right of exclusive use from the OS and the semaphore is turned to the set state. While the semaphore for a particular resource is set, the access of the other tasks to the resource is inhibited by the OS.

A completely different, yet related problem exists in the transfer of overhead messages between processors in a digital wrapper format communications network. Networks that are built to be compliant to the International Telecommunications Union ITU-T G.709 (G.709) specification have several bytes in the overhead for the purpose of Operations, Administration, and Maintenance (OA&M). Many of these overhead bytes are used for messaging in the G.709 network. An individual G.709 overhead byte can contain a unique value every single frame, or else can contain a periodically repeating value with repetition rate of either 64 or 256 frames, or else can maintain the same value for a very long time. Further, some of the G.709 overhead bytes are used in conjunction with one another to make up a message that is longer than one byte per G.709 frame. All 64 of the G.709 overhead bytes are normally received and captured in a software accessible memory on a frame-by-frame basis using the integrated circuit that processes the G.709 network data. The overhead bytes are then made accessible to software so that it can probe the OA&M data at any point in time.

There is no method defined in G.709 for determining if any particular overhead byte is in the process of being captured with a new value, or has just been captured with a new value, or has been constant for a length of time. Typically, software needs to read one or more of these captured overhead bytes either periodically or else in response to an interrupt. Because the response time of most software can be relatively slow compared to the time required to receive one frame of data in a G.709 network, the danger exists that stored overhead bytes can be overwritten before they can be read. There is also a danger that the overhead bytes can be written at the same time that they are being read. Alternately, a relatively complicated interface mechanism must be established between processors to insure that the dropped overhead bytes are not being overwritten. These interface mechanisms undesirably require additional parts, layout allocation, execution time, and power.

It would be advantageous if there were a simple interface mechanism to transfer overhead bytes between processors. It would be advantageous if the simple mechanism prevented overhead bytes from being accidentally overwritten.

It would be desirable if the interfacing software had a mechanism for determining if a particular overhead byte (or set of bytes) was in the process of being updated by the integrated circuit, so as to prevent erroneous data from being read.

SUMMARY OF THE INVENTION

Since the response time of most software can be relatively slow compared to the time required to receive one frame of data in a G.709 network, a mechanism is necessary to prevent a software application from accidental overwriting or corrupting an overhead message being transferred between processors. The present invention defines an integrated circuit architecture that is compliant to the G.709 specification, using a programmable lockout feature on received overhead bytes. This lockout feature permits access to the overhead data in real-time without the possibility of corruption due to overhead memory updates.

More specifically, a programmable semaphore is provided that can be used with the software application to ensure the stability of the overhead bytes being read. That is, to ensure that the overhead bytes are not corrupted (overwritten) during access. In one aspect, the semaphore is implemented using one semaphore register bit inside the processor integrated circuit for each one of the corresponding 64-overhead bytes. That is, each semaphore register bit corresponds to a (buffer) memory location. The invention is not limited to any particular value(s) to represent either the lock or unlock state. When this semaphore register bit is written to a "one" for example, the processor will not allow any received overhead bytes to overwrite the saved byte in memory. Thus, to protect a particular byte (or set of bytes) from being written, the corresponding semaphore register bit (or set of bits) is set to a "one". Then, the overhead byte (or set of bytes) is read from memory, and the corresponding semaphore register bit (or set of bits) is written back to zero. This semaphore procedure ensures that the overhead byte (or set of bytes) being accessed are not corrupted (overwritten) at the same time as they are being read.

Accordingly, a method is provided for securely buffering overhead messages in a network-connected integrated circuit. The method comprises: receiving messages including overhead bytes; collecting overhead bytes; creating a first overhead message from the collected overhead bytes; establishing a overhead message semaphore; and, saving the first overhead message until it is read, in response to the semaphore.

Receiving messages including overhead bytes includes receiving messages in a frame format, and collecting overhead bytes includes collecting a first number of overhead bytes per frame from a second number of frames. Creating a first overhead message from the collected overhead bytes includes writing the first number of collected bytes from each of the second number of frames to a buffer, and saving the first overhead message until it is read includes not overwriting the first overhead message stored in the buffer until the buffer is read. Not overwriting the first overhead message stored in the buffer until the buffer is read includes the substeps of: setting the semaphore to the lock state; and, in response the semaphore lock state, not writing collected overhead bytes for a second overhead message to the buffer.

The method further comprises: reading the first overhead message in the buffer; collecting new overhead bytes; creating a second overhead message from the collected new overhead bytes; and, saving the second overhead message until it is read.

Collecting overhead bytes for the second overhead message includes the substeps of: setting the semaphore to the unlock state following the reading of the first overhead message; and, collecting a first number of overhead bytes from a second number of frames. Then, creating a second overhead message from the collected new overhead bytes includes writing a first number of new overhead bytes to the buffer in response to the semaphore unlock state, and saving the second overhead message until it is read includes setting the semaphore to the lock state in response to creating the second overhead message in the buffer.

Additional details of the above-described method, and a system for securely buffering overhead messages with a network-connected integrated circuit are provided below.

DETAILED DESCRIPTION OF THE PREFERRED EMBODIMENTS

Figure 1:
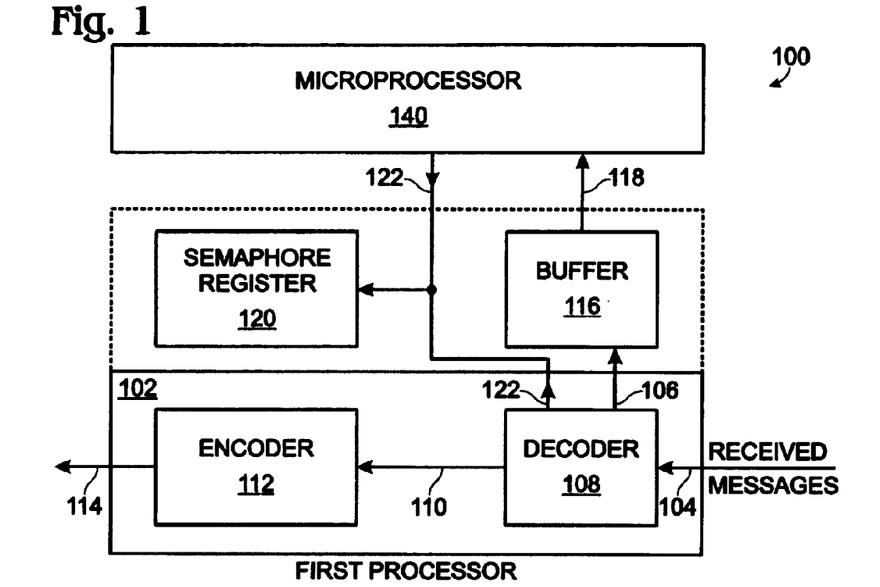
FIG. 1 is a schematic block diagram of the present invention system for securely buffering overhead messages in a network-connected integrated circuit.

FIG. 1 is a schematic block diagram of the present invention system for securely buffering overhead messages in a network-connected integrated circuit. The system 100 comprises a processor 102 having an input on line 104 for receiving messages including overhead bytes, and an output on line 106 for supplying overhead bytes. Because of the possibility for confusion between processor 102 and a microprocessor, presented below, the processor 102 is sometimes referred to herein as a data processor. Typically, the receive messages are coded for forward error correction (FEC) and the data processor 102 includes a decoder 108 to decode the FEC. The decoded message is supplied on line 110, and FEC coded again by an encoder 112, before the message is retransmitted on line 114. Sections of the received message overhead section may be replaced or modified before the message is encoded. However, the use of the encoding aspect of processor 102 is optional, outside of the scope of the present invention system 100.

Figure 2A:
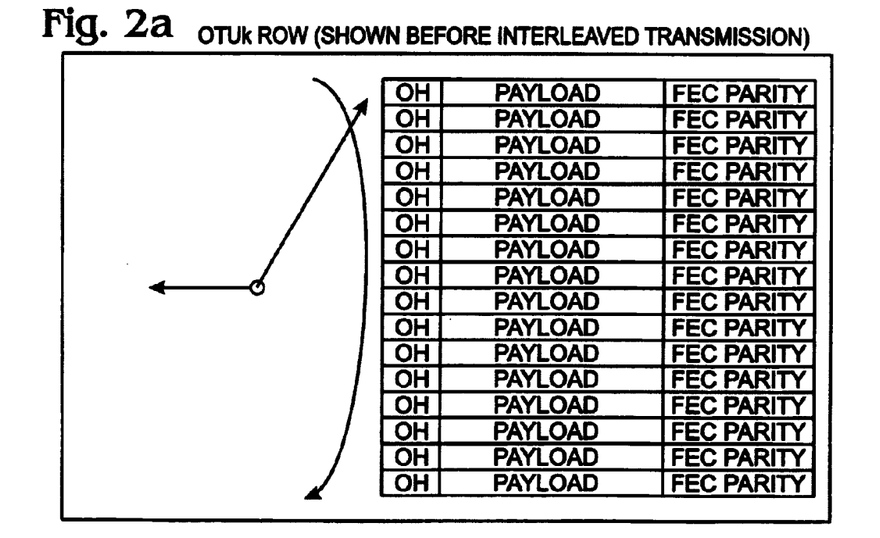
FIGS. 2a through 2c are diagrams illustrating the G.709 optical data unit (ODU) frame structure, and the ODU, optical channel payload unit (OPU), and optical channel transport unit (OTU) overhead.
Figure 2B:
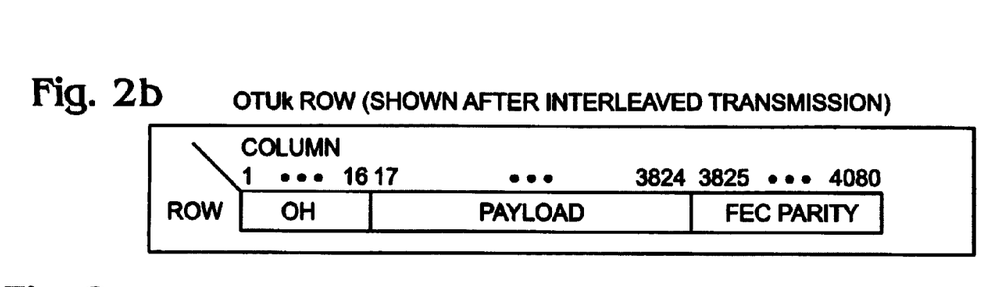
Figure 2C:
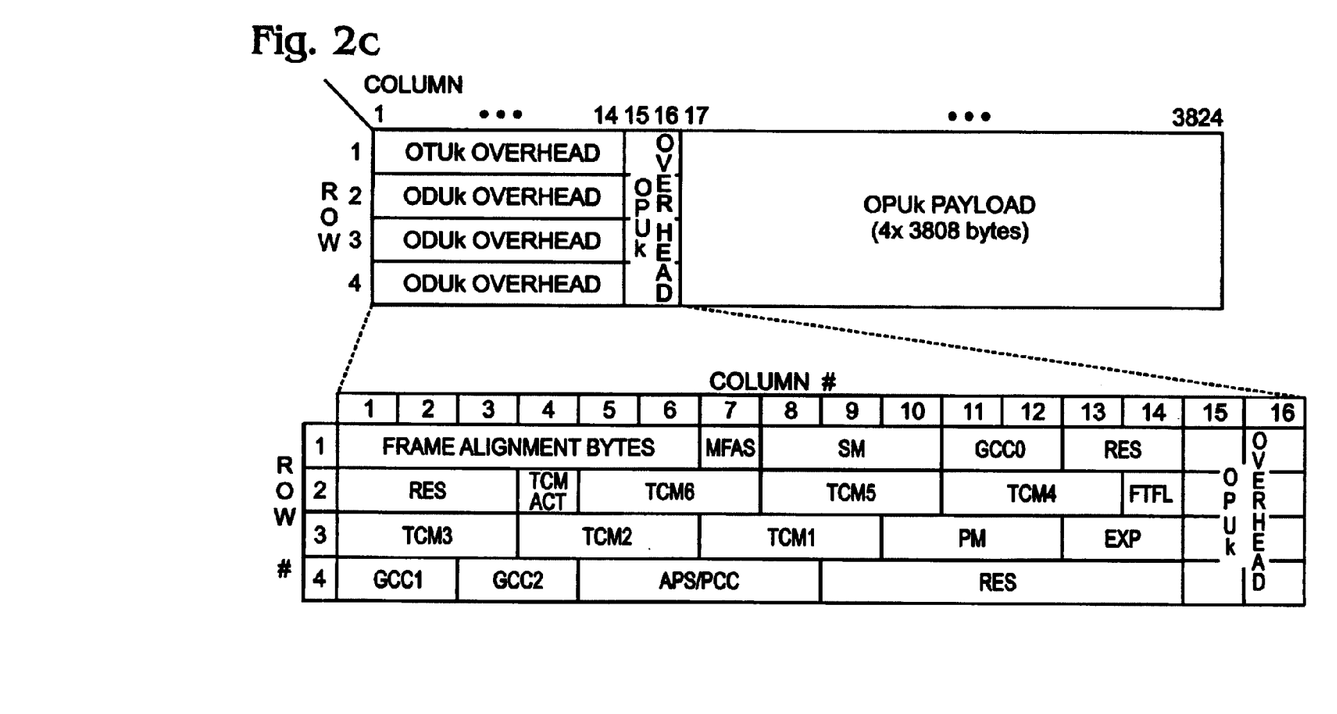
Figure 2D:
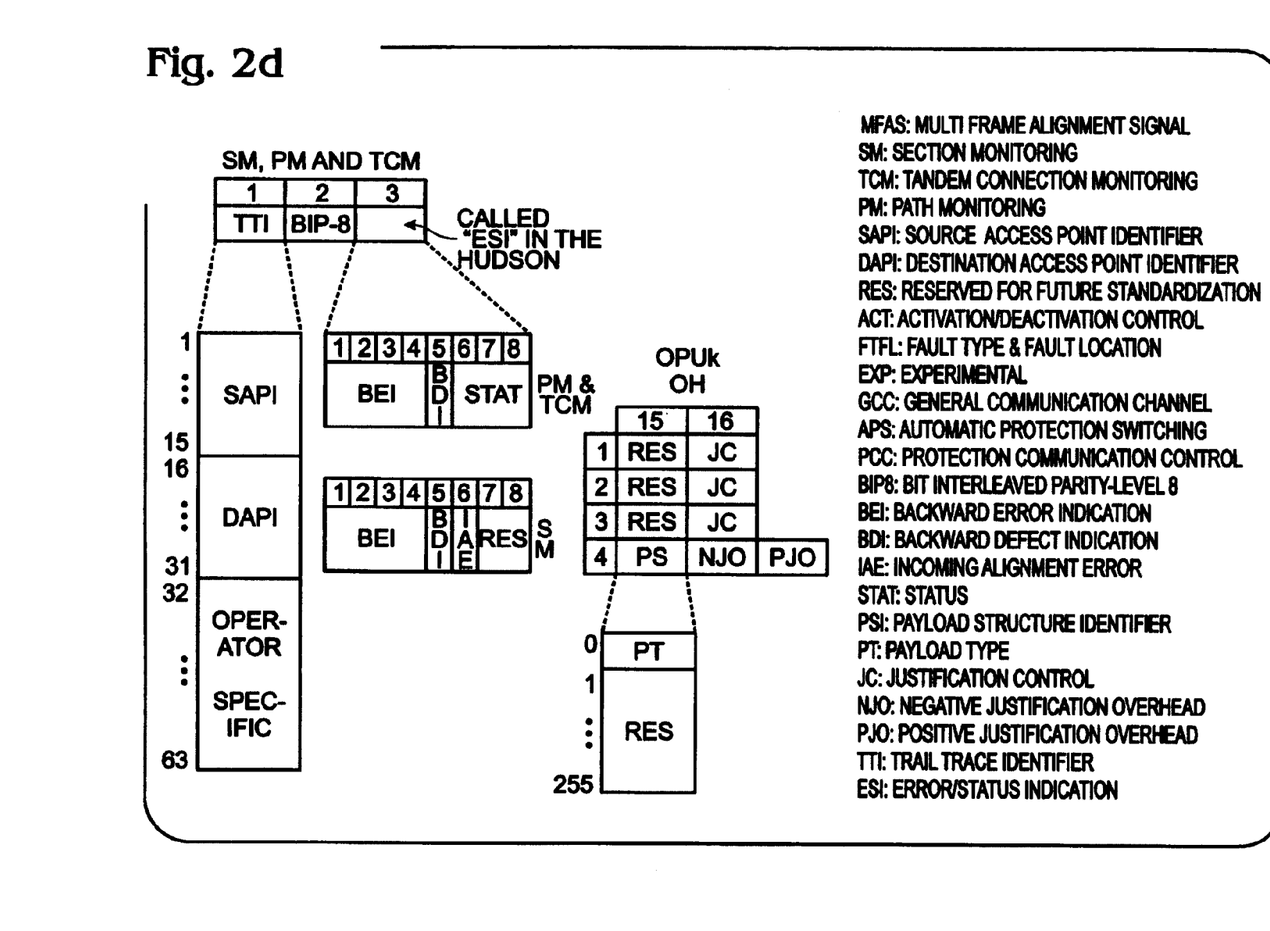

FIGS. 2a through 2c are diagrams illustrating the G.709 optical data unit (ODU) frame structure, and the ODU, optical channel payload unit (OPU), and optical channel transport unit (OTU) overhead. More specifically, a frame is shown that is composed of 4 rows. In a G.709 compliant system, it is normal to provide read access to all 64 of the G.709 overhead bytes by dropping them to the user interface during each frame. Alternately stated, 16 overhead bytes are dropped from each row and 64 overhead bytes are dropped from each frame.

Returning to FIG. 1, a message buffer 116 has an input on line 106 to accept overhead bytes. The buffer is shown surrounded by dotted lines. The dotted lines are intended to show that the buffer 116 can be integral to the processor 102 or enabled as an integrated circuit distinct from the processor 102. The buffer 116 collects overhead bytes to create an overhead message from the collected overhead bytes and supplies the overhead message at an output on line 118.

A semaphore register 120 protects the buffered overhead message from being overwritten until the buffer 116 is read. Again, the semaphore register 120 is shown surrounded by a dotted line since it can be integral in the processor 102, enabled as a separate IC, or integral with the buffer 116.

The data processor 102 receives messages in a frame format (see FIG. 2c) and supplies a first number of overhead bytes per frame for a second number of frames. As noted above, each row includes 16 overhead bytes, or each frame includes 64 overhead bytes. Although all the overhead bytes are typically dropped, not every dropped overhead byte is particularly of interest. That is, not every overhead byte that is dropped from a frame (or row) is collected in the buffer 116. The semaphore register 120 protects the buffered overhead message in the message buffer 116 by alerting the processor 102 that the overhead message has not yet been read. The processor 102 supplies overhead bytes to the buffer in response to the semaphore register 120.

More specifically, the semaphore register 120 has an input on line 122 to accept lock and unlock values. The processor 102 ceases to supply overhead bytes to the buffer 116 in response to the lock value loaded in the semaphore register 120. Alternately, the processor 102 supplies overhead bytes to the buffer 116 in response to an unlock value loaded in the semaphore register 120. The lock value in the semaphore register 120 is changed to the unlock value after the buffer 116 is read.

Returning again to FIG. 2c, the processor supplies trail trace identifier (TTI) overhead bytes every frame that can be of particular interest with respect to the present invention. The TTI byte is shown located in the first byte of every tandem connection monitor (TCM) message. There are six TCM messages located in row 2, columns 5 through 13 and row 3, columns 1 through 8. When TTI bytes are being collected for the overhead message, the TTI bytes are collected for a second number of frames, where the second number is equal to 64 frames. The message buffer 116 in FIG. 1 accepts at least one trail trace identifier (TTI) byte every frame to create an overhead message from storing the second number of collected TTI bytes. In some aspects of the system 100, more than one TTI byte is accepted every frame. From 1 to 8 TTI bytes can be collected every frame.

However, there are many other types of overhead messages that can be collected. Messages can typically be collected over the span of 1 to 256 frames. For example, the fault type and fault location (FTFL) message is a 256-byte message, divided into a pair of 128-byte messages, that are collected over the span of 256 frames. Other overhead messages include: general communication channel (GCC), experimental (EXP), and automatic protection switching/ protection communication control (APS/PCC) messages. This is not intended to be an exhaustive list of all possible messages. In some aspects of the invention the overhead message may also include combinations of these above-mentioned overhead bytes. Although many of these messages may remain the same from frame-to-frame, or remain constant over a periodic interval of several frames, many of these messages are examples of messages that are only one frame long, and they highlight the need for the system 100 to protect one-frame messages (where the second plurality of frames equals 1). Because these messages are received every frame, they must be read approximately once per frame. At a 10-gigabit (OTU2) rate, a frame occurs about every 12 microseconds. On the other hand, an overhead message composed of TTI bytes must only be read every 64*12 microseconds at the OTU2 rate.

Figure 3:
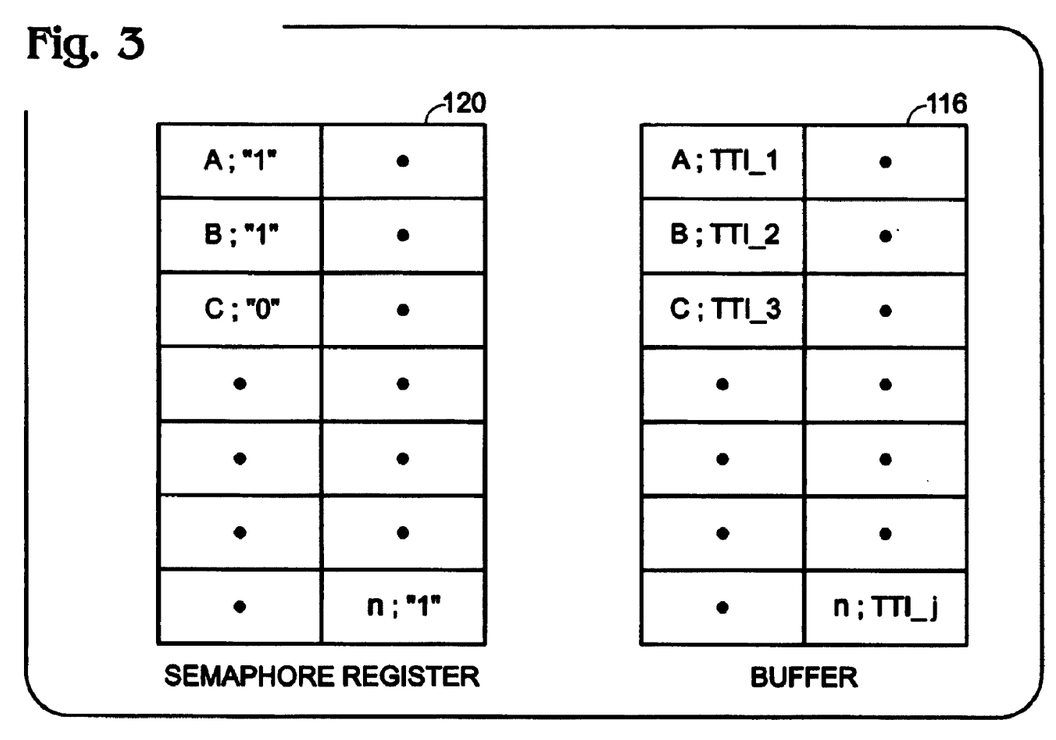
FIG. 3 is an illustration of the buffer and the semaphore register of FIG. 1, using TTI bytes as an example overhead message.

FIG. 3 is an illustration of the buffer 116 and the semaphore register 120 of FIG. 1, using TTI bytes as an example overhead message. For simplicity, the collection of overhead bytes has been, until now, treated as a single overhead message that is protected by a single semaphore register. In this aspect of the system 100, a single semaphore is used to protect a single overhead message. However, each overhead byte stored in the buffer 116 can also be considered an independent overhead message. Alternately stated, the buffer stores a plurality of overhead messages that may be one, or more than one byte in length. In the extreme case, the semaphore register 120 includes a second number of semaphore register corresponding to each one of the first number of overhead bytes collected in the second number of frames.

As shown, the semaphore register 120 includes register A, B, C, through n, where n can be any number. Buffer 116 includes a corresponding set of memory locations A, B, C through n. Although TTI bytes are being shown as the overhead messages in the buffer 116, it should be understood that the memory locations are not limited to any particular size and they may actually store multi-byte overhead messages. Assuming that "1" is a lock value and that "0" is an unlock value, it can be seen that memory locations A, B, and n are protected from overwriting. It should also be understood that lock and unlock values are not limited to any particular number of bits or particular bit values.

The semaphore register 120 includes a second number of semaphore registers corresponding to each one of the first number of overhead bytes collected in the second number of frames. Thus, a semaphore exists for each frame. Then there is a second number of semaphores corresponding to the second number of frames. The data processor loads the unlock value into each semaphore register in response to writing the corresponding second number of overhead messages into a second number of memory locations in the buffer 116. An unlock value is loaded into each semaphore register in response to reading the corresponding overhead message from the buffer. For example, if three bytes per frame are written into the buffer 116 for 64 frames, then there are 64 total overhead messages, each of 3 bytes. 64 semaphore registers and 64 buffer memory locations are used. As shown, the data processor has written a "1" into semaphore registers A, B, and n after writing to memory locations A, B, and n in the buffer 116. An unlock value is loaded into each semaphore registers is response to reading the corresponding first number of overhead bytes from the buffer.

It should also be understood that the buffer 116 may store more than one overhead message, and that these different messages may be updated over a different cycle of frames. For example, a first overhead message may be of TTI bytes, say 2-bytes per frame, collected over the span of 64 frames. While the second overhead message is an FTFL message collected over the span of 256 frames. Then, two semaphores would be needed, one for each overhead message. As another variation, a different semaphore may be used for each TTI 2-byte group. Then, 64 semaphores would be needed for the first overhead message and one semaphore for the second overhead message.

The system 100 is perhaps better appreciated in the context of a network connected to the processor 102. Then, a microprocessor 140 must be introduced. Alternately, the microprocessor can be enabled as a logic state machine. The microprocessor 140 has an input connected to the buffer output on line 118 to read overhead bytes from the buffer 116.

As noted above, the data processor 102 ceases to supply overhead bytes to the buffer 116 in response to the lock value being loaded in the semaphore register 120. The microprocessor 140 has an output on line 122 to change the lock value in the semaphore register 120 to the unlock value, in response to reading the buffer 116. When, a plurality of overhead messages are stored in the buffer and protected with a corresponding plurality of semaphore registers, the microprocessor 140 loads the unlock value into each semaphore register 120 in response to reading the corresponding overhead message from the buffer 116.

Figure 4:
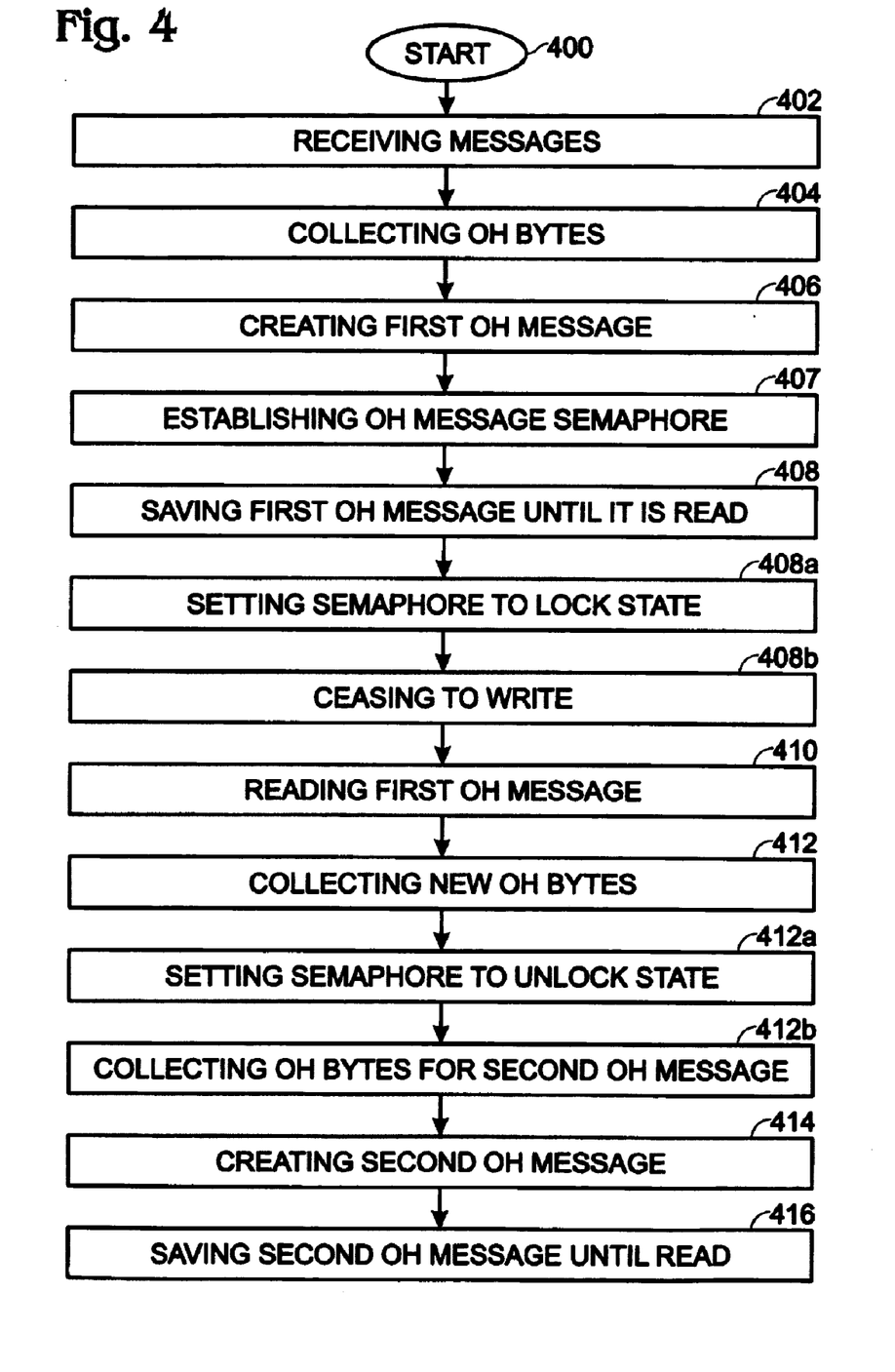
FIG. 4 is a flowchart illustrating the present invention method for securely buffering overhead messages in a network-connected integrated circuit.

FIG. 4 is a flowchart illustrating the present invention method for securely buffering overhead messages in a network-connected integrated circuit. Although the method (and the method of FIG. 5 below) is depicted as a sequence of numbered steps for clarity, no order should be inferred from the numbering unless explicitly stated. The method starts at Step 400. Step 402 receives messages including overhead bytes. In some aspects, receiving a message including overhead bytes includes receiving a G.709 format message with 16 overhead bytes per row, and thus, 64 bytes per frame. Step 404 collects overhead (OH) bytes. Step 406 creates a first overhead message from the collected overhead bytes. Step 408 saves the first overhead message until it is read.

Receiving messages including overhead bytes in Step 402 includes receiving messages in a frame format. Collecting overhead bytes in Step 404 includes collecting a first number of overhead bytes per frame from a second number of frames. Creating a first overhead message from the collected overhead bytes in Step 406 includes writing the first number of collected bytes from each of the second number of frames to a buffer. Then, saving the first overhead message until it is read in Step 408 includes not overwriting the first overhead message stored in the buffer until the buffer is read.

Some aspects of the method include further steps. Step 410 reads the first overhead message in the buffer. Step 412 collects new overhead bytes. Step 414 creates a second overhead message from the collected new overhead bytes. Step 416 saves the second overhead message until it is read.

In some aspects of the method a further step, Step 407, establishes an overhead message semaphore. Then, saving the first overhead message until it is read in Step 408 includes overwriting the buffer with the second overhead message in response to the semaphore.

In some aspects, not overwriting the first overhead message stored in the buffer until the buffer is read in Step 408 includes substeps. Step 408a sets the semaphore to the lock state. Step 408b, in response to the semaphore lock state, ceases the writing of collected overhead bytes to the buffer for the second overhead message.

In some aspects of the method, collecting overhead bytes for the second overhead message in Step 412 includes substeps. Step 412*a* sets the semaphore to the unlock state following the reading of the first overhead message. Step 412*b* collects a first number of overhead bytes from a second number of frames. Creating a second overhead message from the collected new overhead bytes in Step 414 includes writing a first number of new overhead bytes to the buffer in response to the semaphore unlock state. Then, saving the second overhead message until it is read in Step 416 includes setting the semaphore to the lock state in response to creating the second overhead message in the buffer. Now, the buffer cannot be overwritten by a subsequent third overhead message.

In some aspects of the method, collecting a first number of overhead bytes per frame from a second number of frames in Step 404 includes collecting trail trace identifier (TTI) bytes every frame, for a second number of frames equal to 64 frames. Then, creating a first overhead message in Step 406 includes creating an overhead message from the TTI bytes in the 64 frames (note, more than one TTI byte can be collected pre frame). Alternately, collecting a first number of overhead bytes per frame for a second number of frames in Step 404 includes collecting two fault type and fault location (FTFL) messages of one byte per frame, for 256 frames. Other message that can be collected over the span of several frames include general communication channel (GCC), experimental (EXP), and automatic protection switching/ protection communication control (APS/PCC) messages for one frame, where the second number equals one. For the above-mentioned messages that are one-frame messages, Step 406 creates an overhead message every frame.

In some aspects, establishing a overhead message semaphore in Step 407 includes establishing a byte semaphore for each overhead byte in the buffer. Then, saving the first overhead message until it is read in Step 408 includes overwriting each overhead byte in the first overhead message with an overhead byte in the second overhead message in response to a corresponding the byte semaphore.

Figure 5:
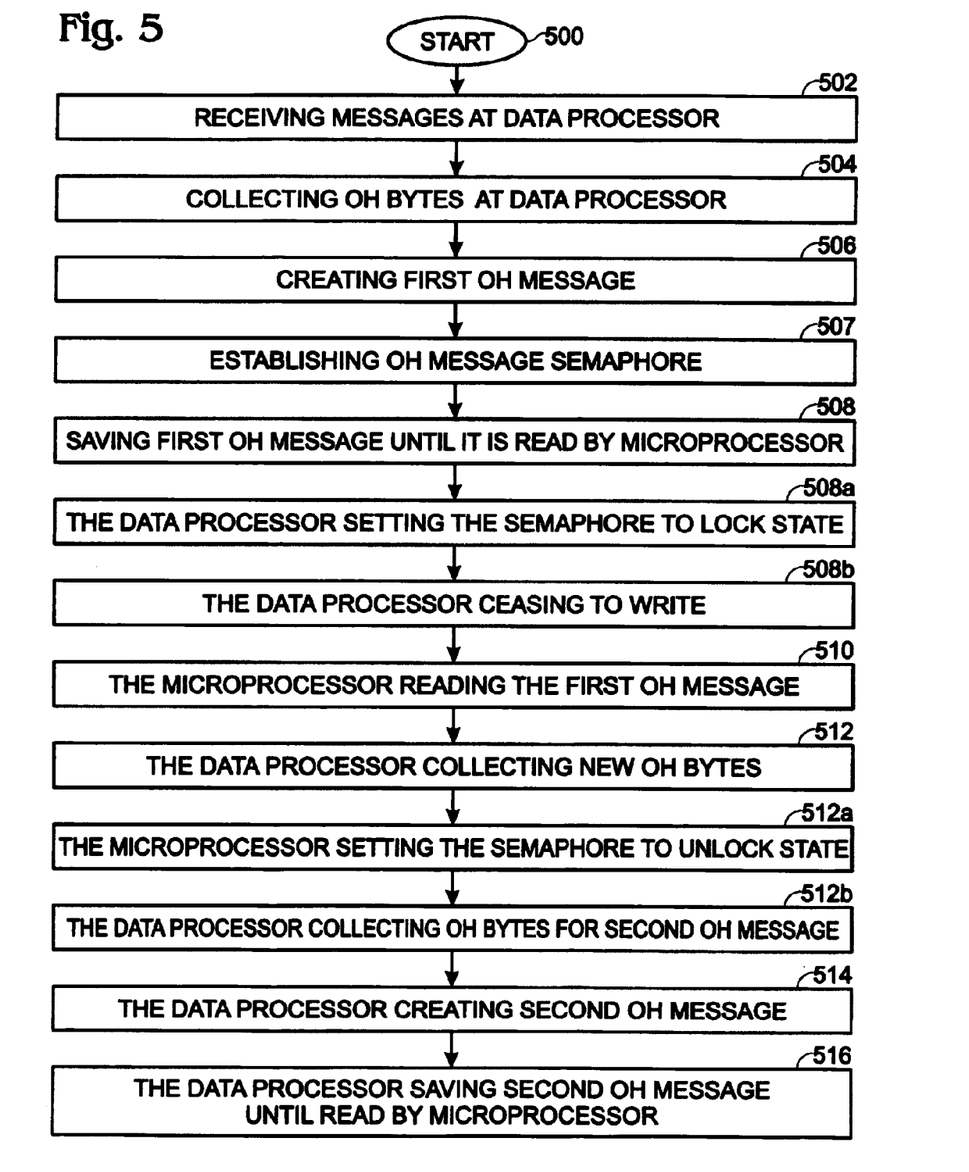
FIG. 5 is a flowchart illustrating the present invention method for securely buffering overhead messages from the perspective of a data processor communicating with a microprocessor.

FIG. 5 is a flowchart illustrating the present invention method for securely buffering overhead messages from the perspective of a data processor communicating with a microprocessor. The method starts at Step 500. Step 502 receives a message including overhead bytes at a (data) processor. In some aspects, receiving a message including overhead bytes at the data processor includes receiving a G.709 format message with 16 overhead bytes per row (64 overhead bytes per frame). Step 504 collects overhead bytes. Step 506 creates a first overhead message from the collected overhead bytes. Step 508 saves the first overhead message until it can be read by a microprocessor.

Receiving a message including overhead bytes at a data processor in Step 502 includes receiving messages in a frame format. Collecting overhead bytes in Step 504 includes collecting a first number of overhead bytes per frame from a second number of frames. Creating a first overhead message from the collected overhead bytes in Step 506 includes writing the first number of collected bytes from each of the second number of frames to a buffer. Saving the first overhead message until it is read in Step 508 includes not overwriting the first overhead message stored in the buffer until the buffer is read.

Some aspects of the method include further steps. In Step 510 the microprocessor reads the first overhead message from the buffer. In Step 512 the data processor collects new overhead bytes. In Step 514 the data processor creates a second overhead message from the collected new overhead bytes. Then, in Step 516 the data processor saves the second overhead message until it is read.

In some aspects, Step 507 establishes an overhead message semaphore. Then, saving the first overhead message until it is read in Step 508 includes the data processor overwriting the buffer with the second overhead message in response to the semaphore.

In some aspects of the method, not overwriting the first overhead message stored in the buffer until the buffer is read in Step 508 includes substeps. In Step 508*a* the data processor sets the semaphore to the lock state. Step 508*b*, in response the semaphore lock state, the data processor ceases the writing of collected overhead bytes to the buffer for the second overhead message.

In some aspects, collecting overhead bytes for the second overhead message in Step 512 includes substeps. In Step 512*a* the microprocessor sets the semaphore to the unlock state following the reading of the first overhead message. In Step 512*b* the data processor collects a first number of overhead bytes from a second number of frames. Creating a second overhead message from the collected new overhead bytes in Step 514 includes the data processor writing a first number of new overhead bytes to the buffer in response to the semaphore unlock state. Then, saving the second overhead message until it is read in Step 516 includes the data processor setting the semaphore to the lock state in response to creating the second overhead message in the buffer.

In some aspects, collecting a first number of overhead bytes per frame for a second number of frames in Step 504 includes the first data collecting trail trace identifier (TTI) bytes every frame, for 64 frames. Then, creating a first overhead message in Step 506 includes creating an overhead message of the second number of TTI bytes (TTI bytes collected over the span of the 64 frames). Alternately, collecting a first number of overhead bytes per frame for a second number of frames in Step 504 includes collecting messages selected from the group including fault type and fault location (FTFL), general communication channel (GCC), experimental (EXP), and automatic protection switching/protection communication control (APS/PCC) messages for one frame, where the second number equals one. For the above-mentioned messages that are one-frame messages, Step 506 creates an overhead message every frame.

In other aspects, establishing a overhead message semaphore in Step 507 includes establishing a byte semaphore for each overhead byte in the buffer. Then, saving the first overhead message until it is read in Step 508 includes the data processor overwriting each overhead byte in the first overhead message with an overhead byte in the second overhead message in response to a corresponding the byte semaphore.

A system and method have been provided for securely buffering overhead bytes in communications with a digital wrapper format processor. Although specific examples have been given in the context of the G.709 standard, the concepts of the present invention have broader applications. Other variations and embodiments of the invention will occur to those skilled in the art.

We claim:

1. In a network-connected integrated circuit, a method for securely buffering overhead messages, the method comprising:

receiving messages including overhead bytes in a G.709 format message with 16 overhead bytes per row;

collecting a first number of overhead bytes from a second plurality of frames;

creating a first overhead message from the collected overhead bytes by writing the first number of collected bytes from each of the second number of frames to a buffer;
establishing a overhead message semaphore with a byte semaphore for each overhead byte in the buffer;
saving the first overhead message by not overwriting the first overhead message stored in the buffer until the buffer is read as follows:
  setting the semaphore to the lock state; and,
  in response the semaphore lock state, ceasing the writing of collected overhead bytes to the buffer for a second overhead message;
reading the first overhead message in the buffer;
collecting new overhead bytes as follows:
  setting the semaphore to the unlock state following the reading of the first overhead message;
  collecting a first number of overhead bytes from a second number of frames;
creating a second overhead message from the collected new overhead bytes by writing a first number of new overhead bytes to the buffer in response to the semaphore unlock state;
overwriting each overhead byte in the first overhead message with an overhead byte in the second overhead message in response to a corresponding the byte semaphore; and,
saving the second overhead message until it is read by setting the semaphore to the lock state in response to creating the second overhead message in the buffer.

2. The method of claim 1 wherein collecting a first number of overhead bytes per frame from a second number of frames includes collecting trail trace identifier (TTI) bytes every frame, for 64 frames; and,
  wherein creating a first overhead message includes creating an overhead message from the TTI bytes in the 64 frames.

3. The method of claim 1 wherein collecting a first number of overhead bytes per frame for a second number of frames includes collecting messages selected from the group including fault type and fault location (FTFL), general communication channel (GCC), experimental (EXP), and automatic protection switching/protection communication control (APS/PCC) messages.

4. In a network including a data processor, a method for securely buffering overhead messages, the method comprising:
  receiving a message including overhead bytes at a data processor in a G.709 format message with 16 overhead bytes per row;
  collecting a first number of overhead bytes from a second plurality of frames;
  creating a first overhead message from the collected overhead bytes by writing the first number of collected bytes from each of the second number of frames to a buffer;
  saving the first overhead message by not overwriting the first overhead message stored in the buffer until the buffer is read by a microprocessor as follows:
    the data processor setting the semaphore to the lock state; and,
    in response the semaphore lock state, the data processor ceasing the writing of collected overhead bytes to the buffer for a second overhead message;
  the microprocessor reading the first overhead message in the buffer;
  the data processor collecting new overhead bytes as follows:
    the microprocessor setting the semaphore to the unlock state following the reading of the first overhead message;
    the data processor collecting a first number of overhead bytes from a second number of frames;
  the data processor creating a second overhead message from the collected new overhead bytes by writing a first number of new overhead bytes to the buffer in response to the semaphore unlock state;
  the data processor overwriting each overhead byte in the first overhead message with an overhead byte in the second overhead message in response to a corresponding the byte semaphore; and,
  the data processor saving the second overhead message until it is read by setting the semaphore to the lock state in response to creating the second overhead message in the buffer.

5. The method of claim 4 wherein collecting a first number of overhead bytes per frame for a second number of frames includes the data processor collecting trail trace identifier (TTI) bytes every frame, for 64 frames; and,
  wherein creating a first overhead message includes creating an overhead message of the TTI bytes in the 64 frames.

6. The method of claim 4 wherein collecting a first number of overhead bytes per frame for a second number of frames includes collecting messages selected from the group including fault type and fault location (FTFL), general communication channel (GCC), experimental (EXP), and automatic protection switching/protection communication control (APS/PCC) messages.

7. In a network-connected integrated circuit, a system for securely buffering overhead messages, the system comprising:
  a processor having an input for receiving messages including overhead bytes in a frame format and an output for supplying a first number of overhead bytes for a second number of frames;
  a message buffer having an input to accept overhead bytes, the buffer collecting overhead bytes to create an overhead message from the collected overhead bytes and supplying the overhead message at an output;
  a semaphore register having inputs to accept a lock value and an unlock value, to protect the buffered overhead message from being overwritten until the buffer is read by alerting the processor that the overhead message has not yet been read, the semaphore register including a second number of semaphore registers corresponding to each one of the first number of overhead bytes collected in the second number of frames;
  wherein the processor loads the lock value into each semaphore register in response to writing the corresponding second number of overhead messages into a second number of memory locations in the buffer, and ceases to supply overhead bytes to the buffer in response to the lock value loaded in the semaphore register; and,
  wherein an unlock value is loaded into each semaphore register in response to reading the corresponding second number of overhead messages from the buffer, and the processor supplies overhead bytes to the buffer in response to an unlock value loaded in the semaphore register.

8. The system of claim 7 wherein the processor receives a G.709 format message with 64 overhead bytes per frame.

9. The system of claim 7 wherein the processor supplies trail trace identifier (TTI) overhead bytes every frame, for 64 frames; and,     wherein the message buffer accepts a trail trace identifier (TTI) byte every frame, creating an overhead message from storing collected TTI bytes from the 64 frames.

10. The system of claim 7 wherein the processor supplies bytes selected from the group including fault type and fault location (FTFL), general communication channel (GCC), experimental (EXP), and automatic protection switching/ protection communication control (APS/PCC) messages for one frame; and,     wherein the message buffer accepts a bytes from the selected group every frame, creating an overhead message.

11. In a network of connected processors, a system for securely buffering overhead messages, the system comprising:

a data processor having an input for receiving messages in a frame format including overhead bytes, an output for supplying a first number of overhead bytes per frame, for a second number of frames, and an output to supply semaphore lock values, wherein the data processor ceases to supply overhead bytes to the buffer in response to the lock value being loaded in a semaphore register;

a message buffer having an input to accept the overhead bytes, the buffer collecting overhead bytes to create an overhead message from the collected overhead bytes and supplying the overhead message at an output;

a semaphore register with an input to accept lock and unlock values, to protect the overhead message in the buffer from being overwritten, and with a second number of semaphore registers corresponding to each one of the first number of overhead bytes collected in the second number of frames; and,     a microprocessor having an input to read the overhead message in the buffer and an output to change the lock value in each semaphore register to the unlock value, in response to reading the corresponding overhead message from the buffer.

12. The system of claim 11 wherein the data processor receives a G.709 format message with 16 overhead bytes per row.

13. The system of claim 12 wherein the data processor supplies trail trace identifier (TTI) overhead bytes every frame, for 64 frames; and,     wherein the message buffer accepts trail trace identifier (TTI) bytes every frame and creates an overhead message from storing the collected TTI bytes from the 64 frames.

14. The system of claim 12 wherein the processor supplies bytes selected from the group including fault type and fault location (FTFL), general communication channel (GCC), experimental (EXP), and automatic protection switching/ protection communication control (APS/PCC) messages every frame; and,     wherein the message buffer accepts a bytes from the selected group every frame, creating an overhead message.

15. The system of claim 12 wherein the microprocessor reads the overhead message from the buffer and transmits the overhead message in an upstream message.

\* \* \* \* \*